United States Patent [19]

Sapp

[11] Patent Number: 5,174,507
[45] Date of Patent: Dec. 29, 1992

[54] GATE FOR IRRIGATION SYSTEM

[76] Inventor: Joseph A. Sapp, 511 N. Kent Pl., Kennewick, Wash. 99336

[21] Appl. No.: 815,260

[22] Filed: Dec. 31, 1991

[51] Int. Cl.⁵ .............................................. B05B 3/18
[52] U.S. Cl. .................................. 239/726; 239/722; 239/723
[58] Field of Search ............... 239/722, 723, 726, 743, 239/748, 146, 164, 166, 172, 175, 176; 47/1.7

[56] References Cited

U.S. PATENT DOCUMENTS

| | | | |
|---|---|---|---|
| 4,586,287 | 5/1986 | Bleasdale et al. | 239/166 X |
| 5,012,608 | 5/1991 | Brown | 239/175 X |
| 5,029,757 | 7/1991 | Bourgault et al. | 239/175 X |

Primary Examiner—Andres Kashnikow
Assistant Examiner—Lesley D. Morris
Attorney, Agent, or Firm—Wells, St. John, Roberts, Gregory & Matkin

[57] ABSTRACT

An irrigation line gate is adapted to be connected between an upstream irrigation line and a downstream irrigation line of a mobile irrigation system to allow lateral movement of the irrigation line past a stationary obstacle in a direction perpendicular to the length of the line. The irrigation line gate comprises longitudinally-spaced upstream and downstream manifolds connected between upstream and downstream movable irrigation lines. Laterally-spaced retractable gate pipes extending between the manifolds are sequentially opened to clear an obstacle as the irrigation line passes the obstacle. Each gate pipe is supported adjacent one of the manifolds by a longitudinally-spaced pair of pipe support collars. Each pair of support collars receives one of the gate pipes therethrough for slidable movement between open and closed positions. The gate pipe is received at the other manifold by a receiving bell comprising a receiving ferrule and a tapered guide for guiding the end of the gate pipe into alignment with the receiving ferrule as the gate pipe is closed. Locking devices are included to selectively connect between the support collars and the gate pipes for preventing longitudinal movement of the gate pipes relative to the support collars when the gate pipes are closed.

26 Claims, 8 Drawing Sheets

GATE FOR IRRIGATION SYSTEM

TECHNICAL FIELD

This invention relates to irrigation line gates for allowing movement of irrigation lines past stationary obstacles.

BACKGROUND OF THE INVENTION

A traditional system for irrigating a large agricultural area comprises a series of sprinkler pipes with sprinkler heads at appropriate intervals along the pipe. Covering the entire area requires manually disconnecting each length of pipe, moving each length to a new location, and then reconnecting the pipes at the new location. Such a system is typically moved at regular intervals to cover the entire irrigated area during a fixed period.

More automated irrigation systems are now common. In an automatic system, lengths of irrigation pipe are supported above the ground by driven wheel or carriage assemblies. The supported lengths are connected in a line to move across an irrigated area. Motors and controls are provided to move the irrigation line, either automatically or at an operator's direction. Typical mobile irrigation systems are configured to move laterally or to move about a fixed pivot to cover a large irrigated area.

The coverage of a common mobile irrigation system as described above is often limited by obstacles that block the movement of the irrigation line. Utility poles are the most common type of obstacle. "Utility poles" for high-voltage transmission lines are often more than just a single pole. Instead, they may have four legs and span a large area. For example, the diagonal measurement of some four-leg utility poles is nearly 30 feet.

The existence of such an obstacle on a given parcel of land creates a serious inconvenience and expense. It either limits the useful irrigated area of the land or requires the added expense of manual irrigation. The significance of these limitations is often so great as to decrease the actual value of the land.

The invention described below allows reclamation and irrigation of farm land that had previously been blocked by utility poles or other obstacles. The invention is compatible with existing rotating and lateral move mobile irrigation systems and may be designed to function automatically without operator intervention. Furthermore, the invention is simple and efficient, adding negligibly to the overall cost of a modern irrigation system.

BRIEF DESCRIPTION OF THE DRAWINGS

A preferred embodiment of the invention is described below with reference to the accompanying drawings, which are briefly described below.

DETAILED DESCRIPTION OF THE PREFERRED EMBODIMENT

Figure 1:
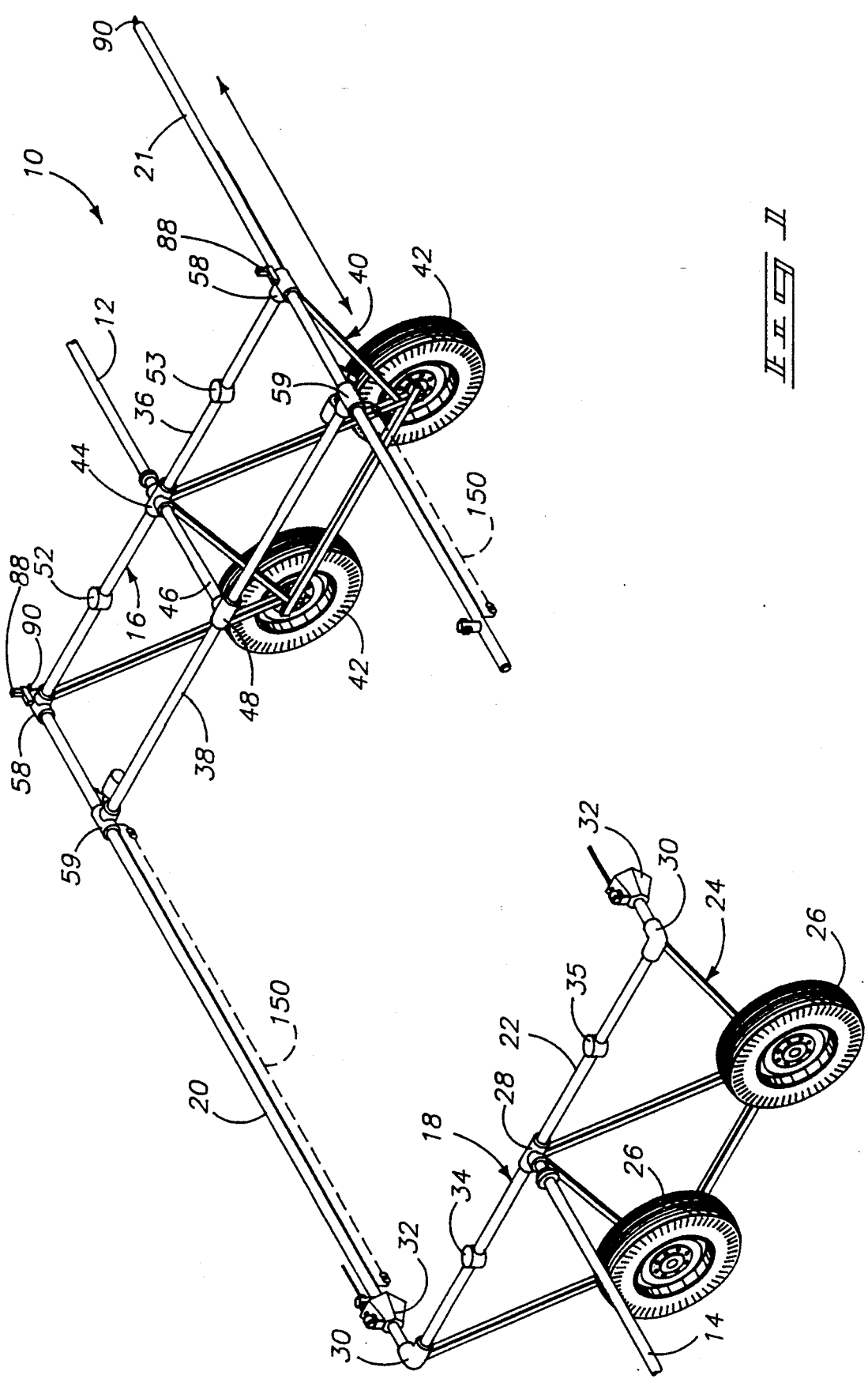
FIG. 1 is an isometric top view of an irrigation line gate in accordance with this invention.
Figure 2:
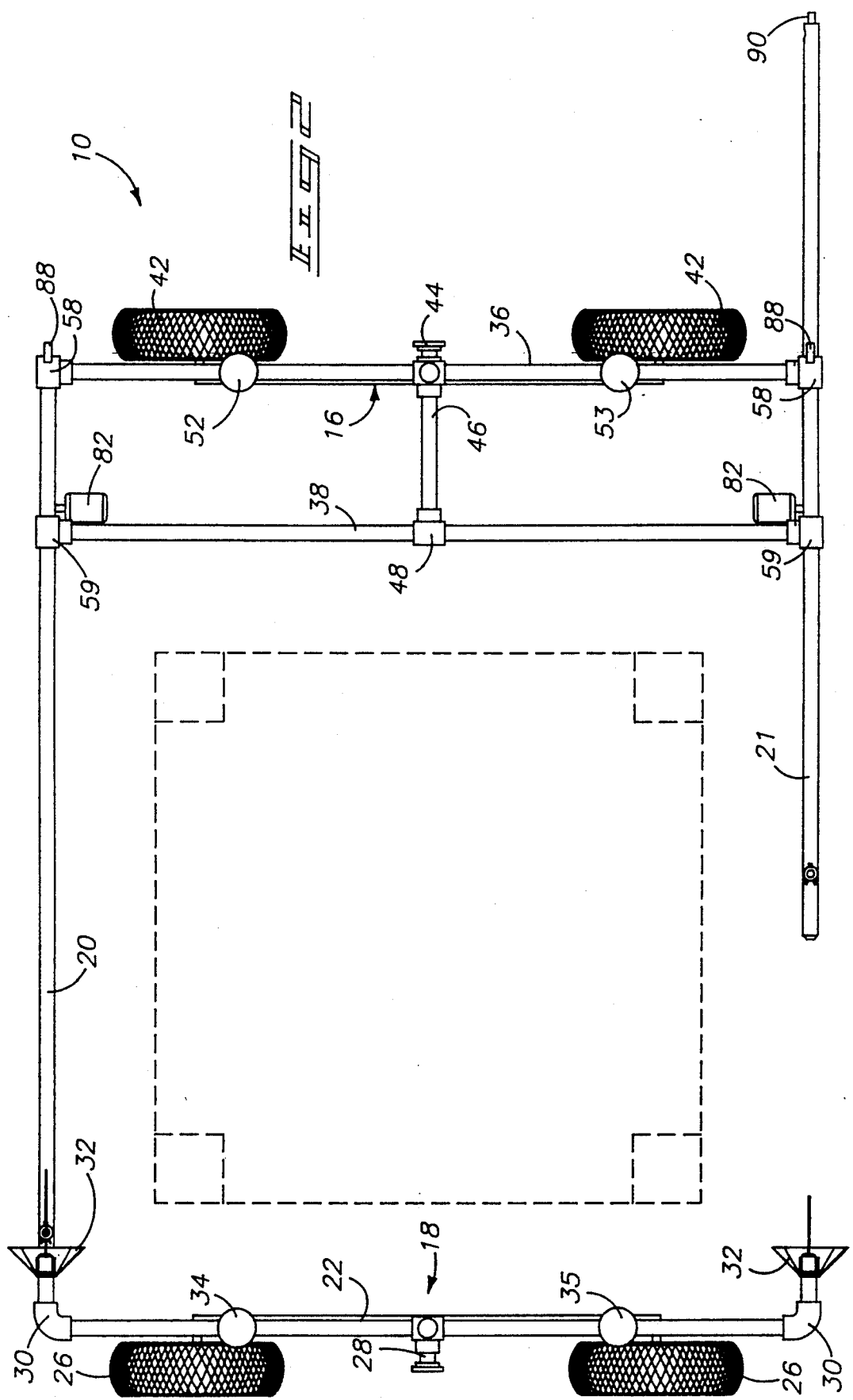
FIG. 2 is a top view of the irrigation line gate of FIG. 1.
Figure 3:
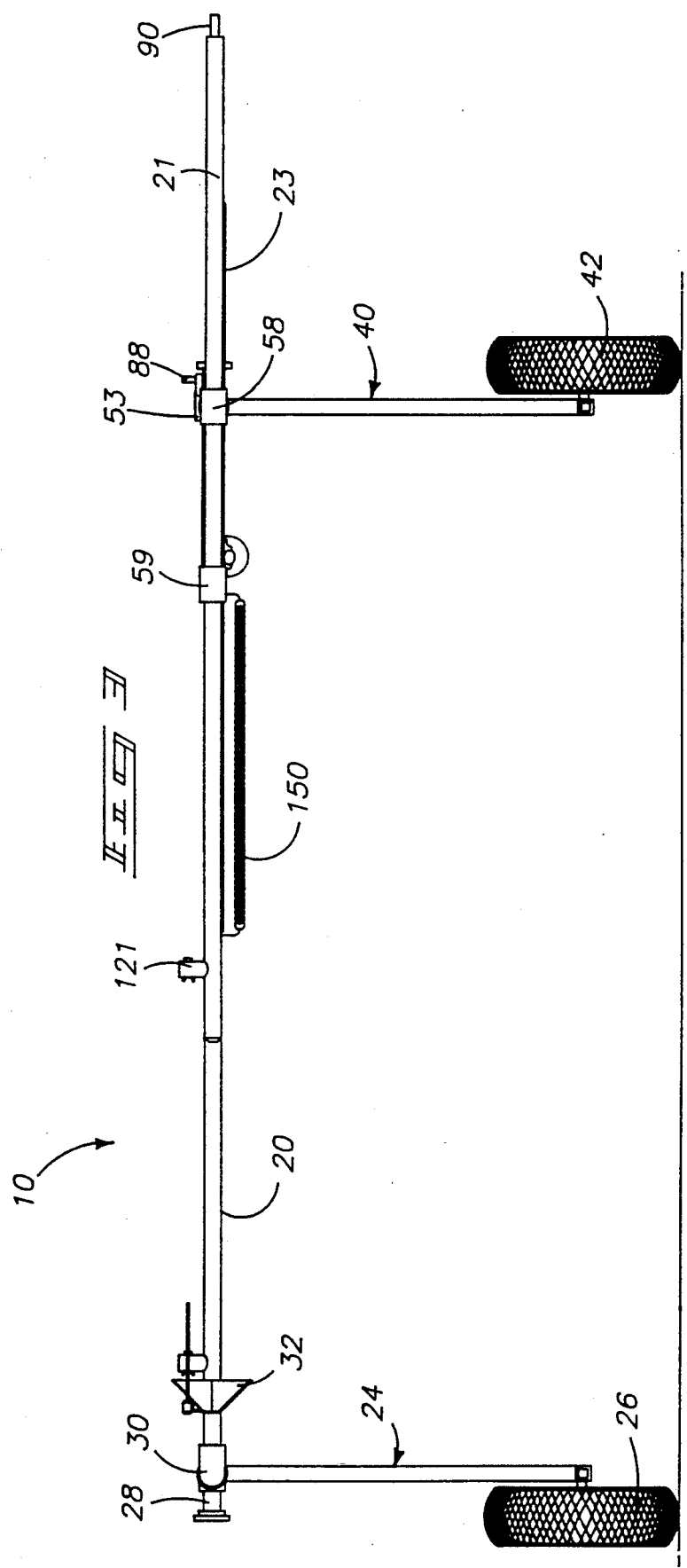
FIG. 3 is a side view of the irrigation line gate of FIG. 1.
Figure 4:
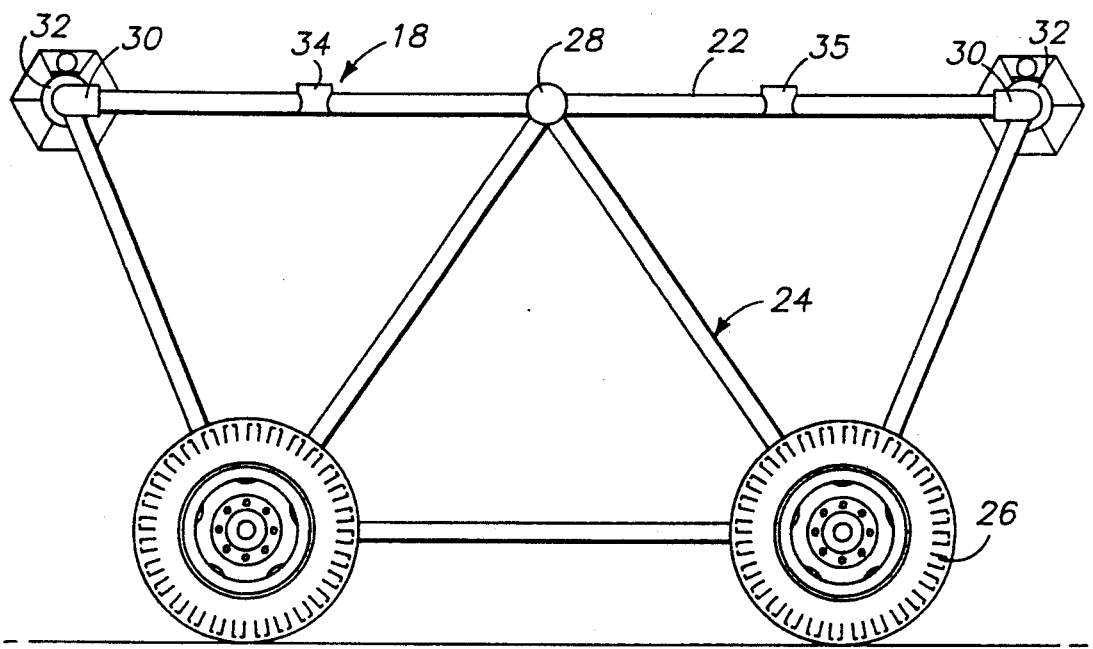
FIG. 4 is an end view of the irrigation line gate of FIG. 1.

This disclosure of the invention is submitted in furtherance of the constitutional purposes of the U.S. Patent Laws "to promote the progress of science and useful arts." U.S. Constitution, Article 1, Section 8.

This invention pertains to an irrigation line gate 10 adapted to be connected between an upstream irrigation line 12 and a downstream irrigation line 14 of a mobile irrigation system to allow lateral movement of the irrigation line past an upstanding stationary obstacle in a direction perpendicular to the length of the line. Irrigation line gate 10 comprises an upstream manifold 16 and a downstream manifold 18. At least two gate pipes 20 and 21 are moveable between open and closed positions. In the open position each gate pipe is clear of one manifold so as to be capable of clearing the stationary obstacle as the irrigation line laterally passes the obstacle. In the closed position each gate pipe spans the two manifolds in fluid communication with the upstream and downstream manifolds.

Irrigation line gate 10 includes pipe receiving means for receiving an end of each gate pipe at one of the manifolds when each gate pipe is closed. Guide means 102 are provided for guiding said ends of the gate pipes into alignment with the pipe receiving means as the gate pipes move to their closed positions from their open positions. Irrigation line gate 10 further includes clamping means for selectively clamping between said ends of the gate pipes and the pipe receiving means to thereby retain said ends of the gate pipes within the pipe receiving means.

Support means are included to guide each gate pipe as it slides between open and closed positions. Locking means are also included to prevent movement of the gate pipes when they are closed.

More specifically, FIGS. 1–4 show a preferred embodiment of an irrigation line gate according to this invention, generally designated by the reference numeral 10. In the preferred embodiment downstream manifold 18 is opposed to and longitudinally spaced from upstream manifold 16. Gate pipes 20 and 21 are laterally spaced from each other in leading and trailing positions. They are longitudinally slidable in relation to manifolds 16 and 18 so that leading and trailing gate pipes 20 and 21 can be moved between open and closed positions. Gate pipes 20 and 21 have rack gears 23 extending along the bottom thereof which are engaged to drive gate pipes 20 and 21 open and closed.

In the open position, gate pipes 20 and 21 are supported by a supporting manifold 16 and are clear of manifold 18. In this position, each gate pipe 20, 21 is capable of clearing an obstacle as the irrigation line laterally passes the obstacle. In the closed position, each gate pipe 20, 21 extends toward and engages receiving manifold 18. Accordingly, in their closed positions gate pipes 20 and 21 connect and communicate between the upstream and downstream manifolds 16 and 18 to provide water flow from upstream irrigation line 12 to downstream irrigation line 14. Only one of gate pipes 20 and 21 need be closed to maintain continuous communication between upstream and downstream irrigation lines 12 and 14. Thus, gate pipes 20 and 21 are sequentially opened and closed to allow line gate 10 to clear an obstacle while maintaining continuous water flow throughout the irrigation system.

In the illustrated embodiment upstream manifold 16 is the supporting manifold and downstream manifold 18 is the receiving manifold for both of gate pipes 20 and 21. Gate pipes 20 and 21 thus move in an upstream direction as they are opened. However, either or both of gate pipes 20 and 21 could be reversed to be supported and received by opposite manifolds without departing from the principles of this invention.

Downstream manifold 18 comprises a downstream lateral water supply pipe 22 supported above the ground by a wheel assembly 24. Wheel assembly 24 has wheels 26 which allow downstream manifold 18 to move laterally. Downstream manifold 18 might alternatively be connected to a standard wheel assembly in a conventional irrigation system. Pipe 22 has an inline tee connection or fitting 28 near its middle which is adapted to be connected to downstream irrigation line 14 and to provide communication between downstream lateral pipe 22 and downstream irrigation line 14. Downstream lateral pipe 22 has an elbow 30 at each of its ends. A receiving bell 32 is mounted to or near each elbow 30 to receive the downstream end of one of gate pipes 20 and 21 when said gate pipe is closed. Receiving bells 32, elbows 30, downstream lateral pipe 22, and fitting 28 provide fluid communication between gate pipes 20 and 21 and downstream irrigation line 14 when the gate pipes are closed.

Leading and trailing downstream valves 34 and 35, corresponding to leading and trailing gate pipes 20 and 21, are connected inline with lateral pipe 22 at opposite sides of tee fitting 28. Each downstream valve 34 and 35 is closed when its corresponding gate pipe is open to prevent water from escaping through an open receiving bell 32. Downstream valves 34 and 35 are selectively opened to supply water to irrigation line 14 from the corresponding gate pipes when the gate pipes are closed.

Upstream manifold 16 comprises an upstream lateral pipe 36 supported by a wheel assembly 40 and wheels 42 to allow lateral movement of upstream manifold 16. Upstream manifold 16 could alternatively be connected to a standard wheel assembly in a conventional irrigation system. Upstream lateral pipe 36 has an inline tee connection or fitting 44 near its middle which is adapted to be connected to upstream irrigation line 12. Tee fitting 44 provides communication between first upstream lateral pipe 36 and upstream irrigation line 12.

Leading and trailing upstream valves 52 and 53, corresponding to leading and trailing gate pipes 20 and 21, are connected inline with first upstream lateral pipe 36 on either side of tee fitting 44. Each valve 52 and 53 is closed when its corresponding gate pipe is open to prevent water from escaping through the open end of the gate pipe. Upstream valves 52 and 53 are selectively opened to supply water from irrigation line 12 to the corresponding gate pipes when the gate pipes are closed.

Additional support for the gate pipes is provided adjacent to upstream manifold 16 by provision of a second lateral pipe 38 supported by tee fitting 44, a tee fitting 48, and a central longitudinal connecting pipe 46. Pipe 38 carries tee fittings 59 at its ends, which slidably support the moving gate pipes inwardly from upstream manifold 16. Pipes 46 and 38 are structured elements only, and do not serve as water conduits. Tee fitting 44 does not provide fluid communication between longitudinal support pipe 46 and upstream irrigation line 12.

The outer ends of pipes 36 and 38 have support slides or collars at their ends which receive gate pipes 20 and 21 and which allow them to slide longitudinally therethrough. Thus a pair of leading and trailing pipe support collars are provided at the end of upstream irrigation line 12, the collars of each pair being longitudinally spaced to support the gate pipes as they move between their open and closed positions.

Figure 5:
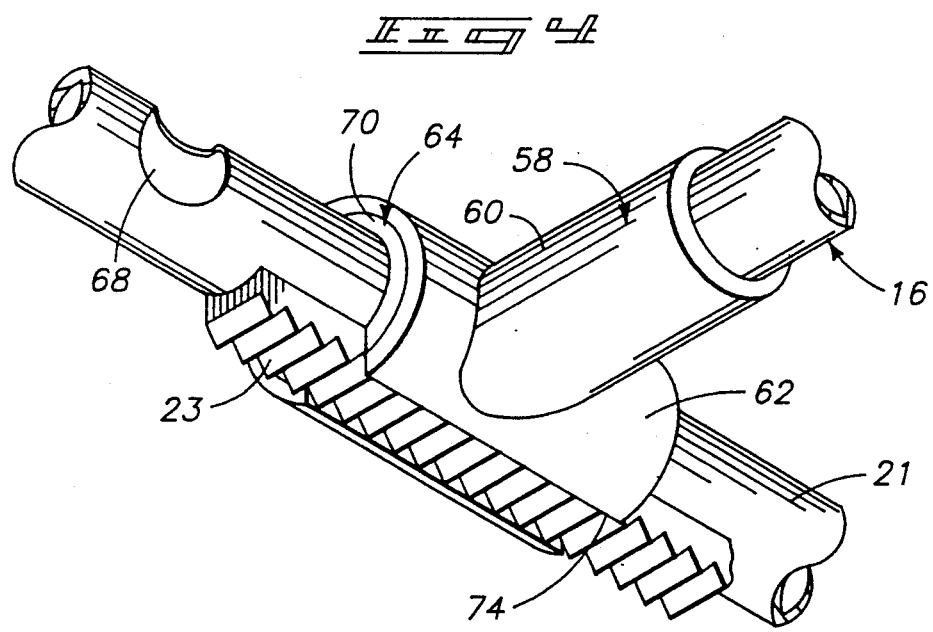
FIG. 5 is a isometric bottom view of a support slide and gate pipe in accordance with this invention.
Figures 6, 7:
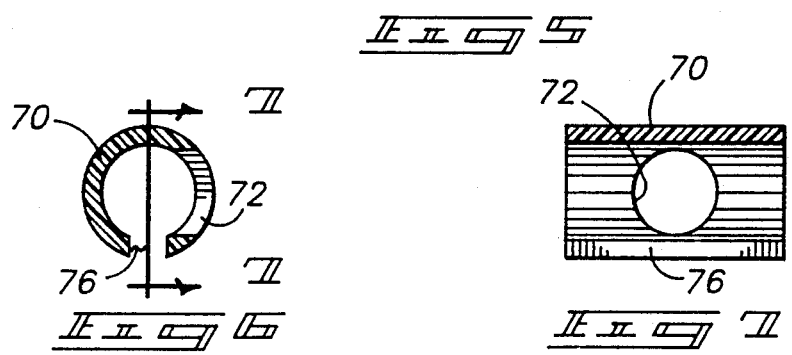
FIG. 6 is a cross-sectional view of a support slide bushing in accordance with this invention.
FIG. 7 is a cross-sectional view of the support slide bushing of FIG. 6.

At least one of each pair of collars comprises a T-shaped pipe fitting 58 having a base member 60 and a tubular cross member 62, best shown in FIGS. 5-7. Base member 60 is connected to and communicates with upstream lateral pipe 36 of upstream manifold 16. Tubular cross member 62 has a longitudinal passage 64 which slidably receives one of the gate pipes 20 and 21. Longitudinal passage 64 has an opening (not shown) which communicates with base member 60. Gate pipes 20 and 21, one of which is received within longitudinal passage 64, have apertures 68 in one end which align with the cross member openings when the gate pipes are closed. Upstream manifold 16 thereby communicates with gate pipes 20 and 21 through T-shaped fittings 58, supplying water to gate pipes 20 and 21 when they are closed. An O-ring (not shown) is preferably seated around the periphery of aperture 68 to seal between the gate pipe and T-shaped pipe fitting 58.

Longitudinal passages 64 are lined with bearings or bushings 70 which provide a slidable bearing surface for supporting gate pipes 20 and 21 while allowing free longitudinal movement of gate pipes 20 and 21. Each bushing 70 has an opening 72 corresponding to the opening in longitudinal passage 64 so as not to interfere with water supply. Longitudinal passages 64 and bushings 70 have slots 74 and 76 extending longitudinally along the bottoms thereof to allow rack gears 23 to pass therethrough. Bushings 70 are preferably constructed of oil-impregnated nylon.

Figure 8:
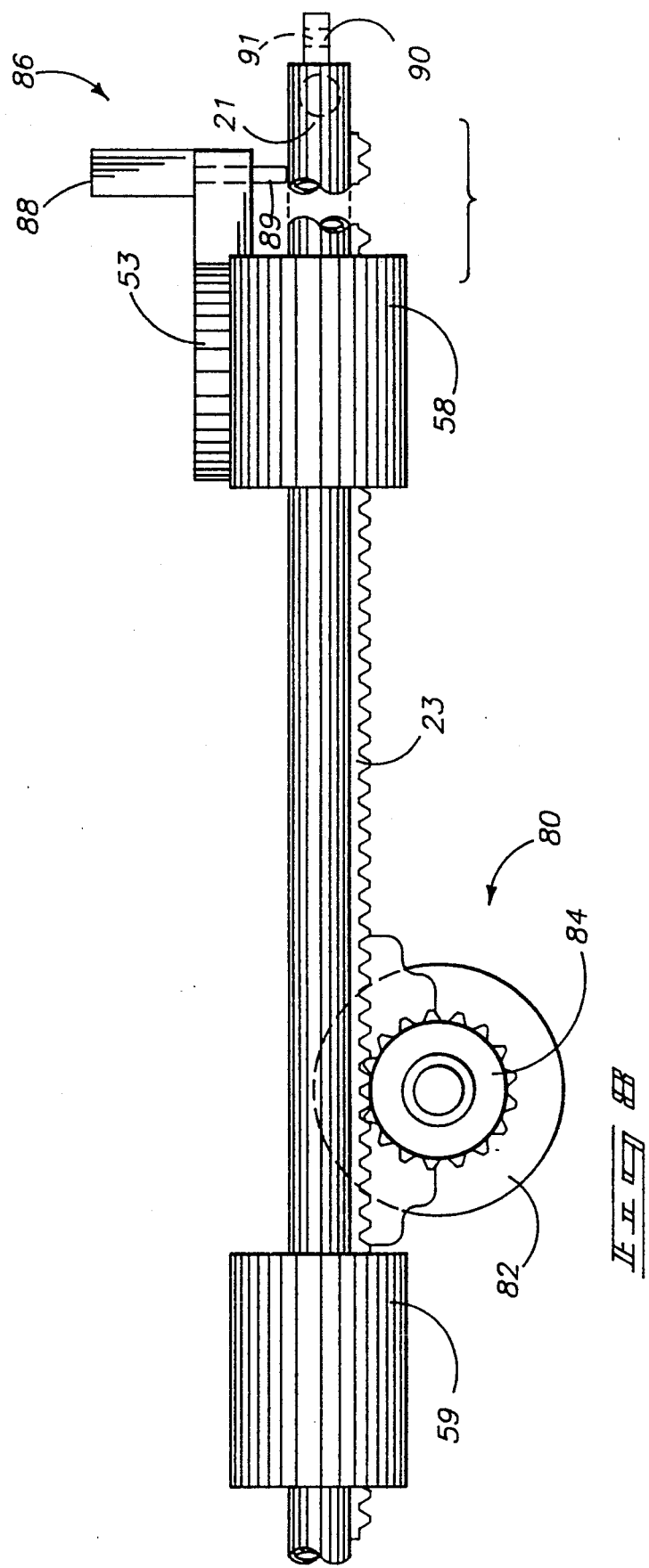
FIG. 8 is a side view of a portion of the irrigation line gate of FIG. 1.

As shown in FIG. 8, drive means 80 is provided on fittings 59 adjacent to the upstream manifold 16 for sequentially driving leading and trailing gate pipes 20 and 21 to their open positions as they approach an obstacle, and for sequentially driving them to their closed positions when they each are past the obstacle. Each drive means 80 comprises a pipe drive motor 82, a gear 84 attached to the drive shaft of motor 82, and one of the racks 23. Pipe drive motors 82 are suitably mounted so that gears 84 engage racks 23. Pipe drive motors 82 are preferably small electric motors.

Although racks 23 are illustrated as extending from the bottom of gate pipes 20 and 21, they can alternatively be placed on the sides of the gate pipes. Such a placement would require modifications to T-shaped fittings 58 and 59 and to the mounting of pipe drive motors 82.

Upstream manifold 16 also supports locking means 86 selectively connected between the support slides and gate pipes 20 and 21 for preventing longitudinal movement of gate pipes 20 and 21 relative to the support slides when gate pipes 20 and 21 are closed and when drive means 80 are not energized. Each locking means 86 comprises a spring-loaded solenoid 88 with a projecting pin 89 which engages a locking tab 90 attached to an end of one of gate pipes 20 and 21. Each solenoid 88 is preferably mounted to or near one of T-shaped fittings 58.

Locking tab 90 has a vertical bore 91 which receives solenoid pin 89 from above. Solenoid pin 89 is outwardly biased and slides along the corresponding gate pipe as it is closed. When the gate pipe is closed, solenoid pin 89 aligns with vertical bore 91 and drops into it, locking the gate pipe or at least preventing any relative longitudinal movement between upstream manifold 16 and the gate pipe. To open one of gate pipes 20 and 21, solenoid 88 is briefly energized to withdraw pin 89 from locking tab 90 while the gate pipe moves open.

Figure 9:
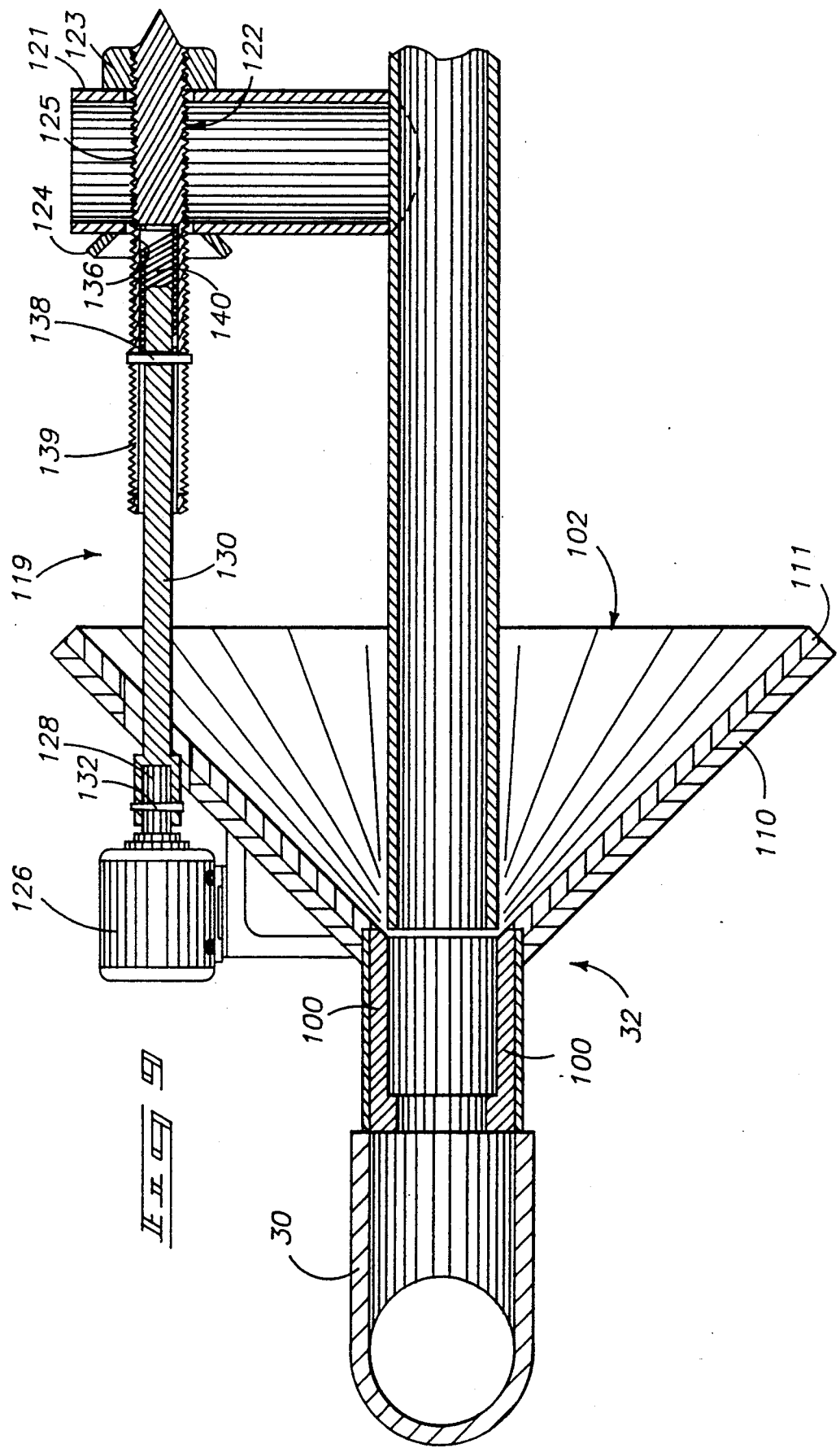
FIG. 9 is a cross-sectional side view of a receiving bell and clamping means in accordance with this invention, with a gate pipe moving into engagement with the receiving bell.
Figure 10:
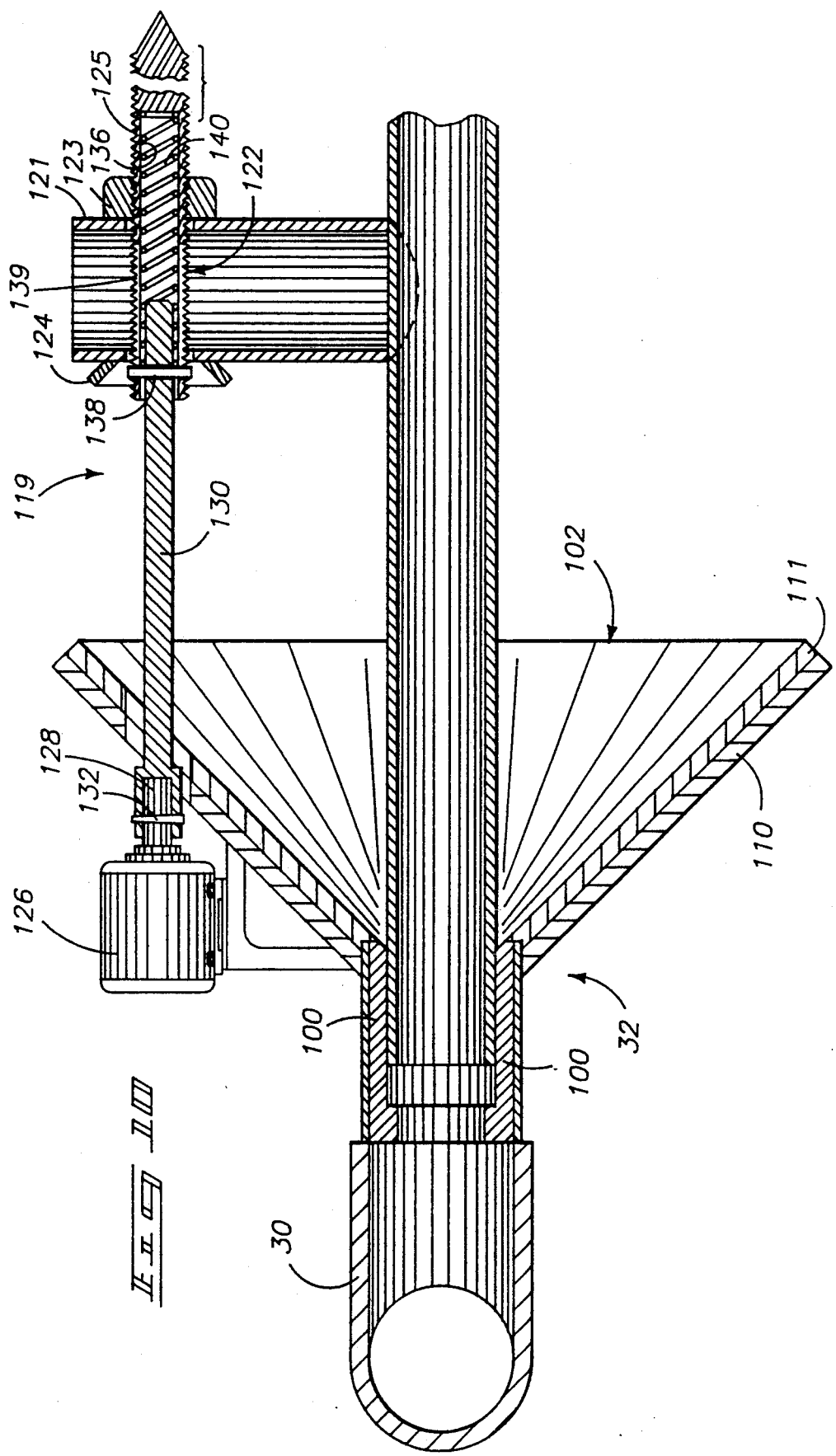
FIG. 10 is a cross-sectional side view of a receiving bell and clamping means in accordance with this invention, with a gate pipe fully engaging the receiving bell.

Referring now to FIGS. 9 and 10, receiving bell 32 comprises a pipe receiving sleeve or ferrule 100 and a guide means 102. Ferrule 100 is a nylon collar or bushing with an inner diameter complementary to the outer diameter of gate pipes 20 and 21. When the gate pipes move to their closed positions, they slide into ferrules 100. Ferrules 100 thus communicate between downstream manifold 18 and gate pipes 20 and 21 when the gate pipes are closed. An O-ring might be used in place of insert 111 in an alternative embodiment.

Guide means 102 is for guiding or urging the ends of gate pipes 20 and 21 into alignment with receiving ferrules 100 as the gate pipes close from their open positions. Guide means 102 comprises a funnel-shaped guide 110 around and projecting from pipe receiving ferrule 100. Funnel-shaped guide 110 is pyramidal, having a polygonal or hexagonal base. Guide 110 thus tapers inwardly toward receiving ferrule 100 and flares outwardly away from receiving ferrule 100. A pyramidal construction eases fabrication, allowing the guide to be formed of joined flat, wedge-shaped pieces. Funnel-shaped guide 110 may alternatively be conical (not shown). Guide means 102 also includes an optional complementary funnel-shaped "DELRIN" insert 111 within funnel-shaped guide 110 which lessens friction and reduces wear of guide means 102.

Line gate 10 has clamping means on downstream manifold 18 which engage gate pipes 20 and 21, urging them into engagement with receiving bells 32 of downstream manifold 18. After engagement, the clamping means selectively clamps between gate pipes 20 and 21 and downstream manifold 18 to maintain engagement.

Each clamping means comprises an engagement clamp 119 which selectively clamps between an end of one of gate pipes 20 and 21 and one of pipe receiving ferrules 100, thereby retaining said end within said pipe receiving ferrule 100. More specifically, each engagement clamp 119 includes an upright projection 121 at an end of one of gate pipes 20 and 21. Upright projection 121 is preferably a short section of tubing which is welded or otherwise attached to a gate pipe. Upright projection 121 has an aperture 122 extending horizontally therethrough in the longitudinal direction of gate pipes 20 and 21. A nut 123 is attached to a side of upright projection 121 away from receiving bell 32. Nut 123 has an internally-threaded bore which aligns with aperture 122. A cone-shaped alignment guide 124 is mounted around aperture 122 on the side of upright projection 121 nearest aperture receiving bell 32.

Engagement clamp 119 also includes an elongated drive screw 125 which extends longitudinally from receiving bell 32. Alignment guide 124 guides screw 125 into aperture 122 as gate pipe 20 or 21 closes. Screw 125 therefore engages the internal threads of nut 123 when the gate pipe nears its closed position. When screw 125 is driven in the appropriate direction, it pulls the end of the gate pipe into funnel-shaped guide 110 and receiving ferrule 100.

Figure 11:
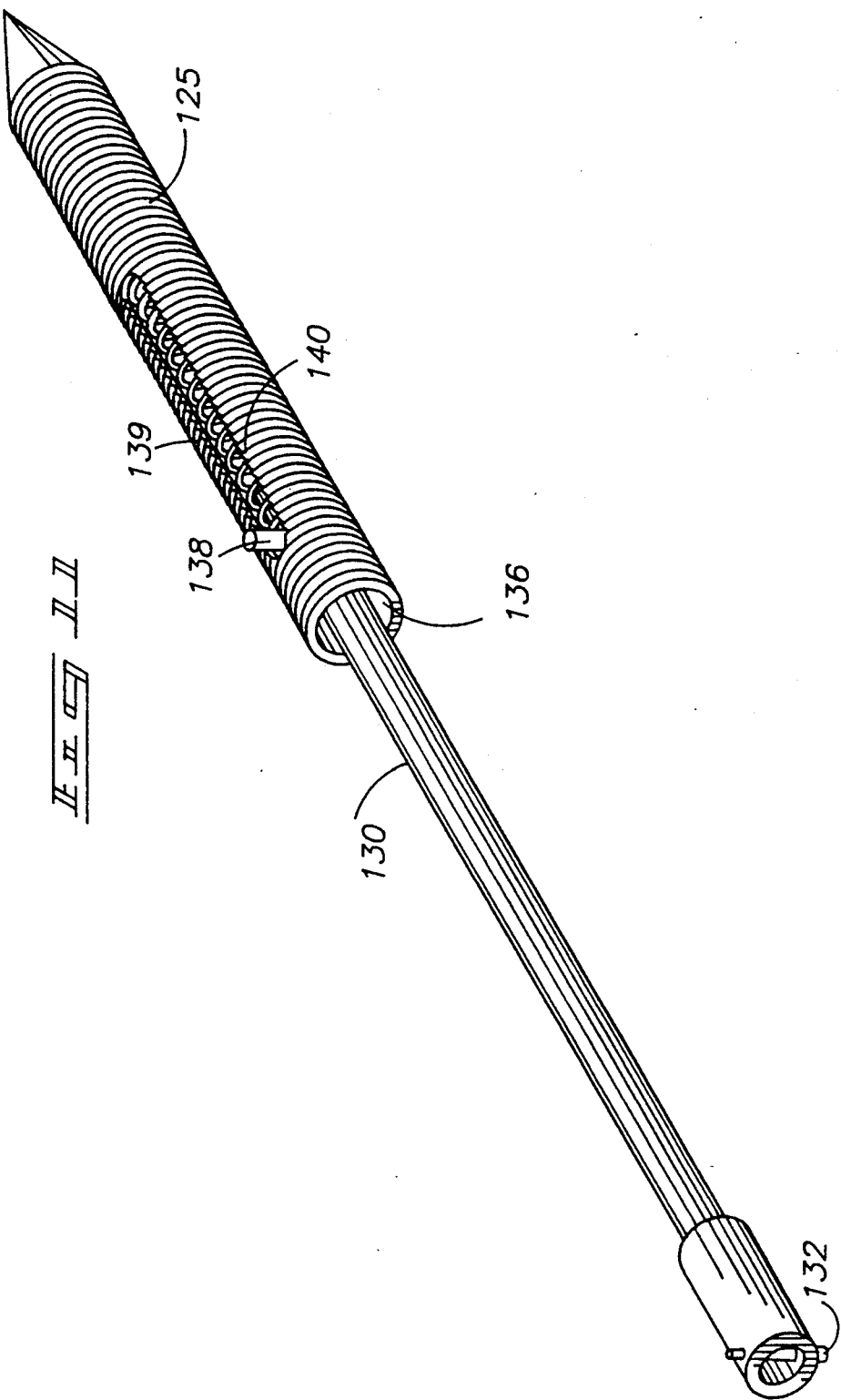
FIG. 11 is an isometric view of a portion of the clamping means of FIGS. 9 and 10.

Engagement clamp 119 has a screw drive means or a screw drive motor 126 for turning screw 125. Screw drive motor 126 has a motor shaft 128 and an elongated drive shaft 130. Elongated drive shaft 130 is received over motor shaft 128 and is retained thereover by a removable pin 132. Screw 125 is slidably attached to elongated drive shaft 130 for limited longitudinal movement relative thereto as best shown in FIG. 11.

Screw 125 has an inner bore 136 which is loosely complementary in diameter to the outer diameter of elongated drive shaft 130, and which is slidably received over elongated drive shaft 130. Elongated drive shaft 130 has an aperture near its outer end through which a removable dowel pin 138 is received. Pin 138 extends radially outwardly on both sides of elongated drive shaft 130 through opposed slots 139 in screw 125. Opposed slots 139 extend longitudinally along screw 125, aligning with pin 138 to retain screw 125 on elongated drive shaft 130 while allowing limited longitudinal movement of the screw relative to the drive shaft.

A coiled compression spring 140 surrounds elongated drive shaft 130 within inner bore 136. It extends from pin 138 to the end of inner bore 136, biasing screw 125 to an outwardly extended position relative to drive shaft 130. Screw 125 is moveable against the bias of spring 140 to an inwardly contracted position. The extending end of screw 125 is tapered to further guide screw 125 into aperture 122.

When a gate pipe closes, screw 125 engages nut 123. Motor 126 begins rotating screw 125, but at a slower rate than necessary to keep up with the closing gate pipe. Accordingly, screw 125 is pushed longitudinally back toward motor 126 against the pressure of spring 140 as shown in FIG. 9. However, screw 125 eventually catches up with the longitudinal motion of the gate pipe and extends outwardly as far as pin 138 and slots 139 will allow. Screw 125 then begins pulling the end of the gate pipe within funnel-shaped guide 110 and further within receiving ferrule 100 as shown in FIG. 10. Once the clamping means has produced solid engagement between the end of the gate pipe and downstream manifold 18, motor 126 is turned off. Screw 125, however, continues to clamp between the gate pipe and downstream manifold 18. The thread pitch of screw 125 is relatively fine so that it will not rotate without assistance from motor 126.

Electrical and electronic connections between irrigation lines 12 and 14 are made by coiled cables 150, and by connectors (not shown) near receiving bell 32 and the ends of gate pipes 20 and 21. Articulated steel conduit could alternatively be used in place of coiled cables 150. Irrigation line gate 10 also includes conventional electronic control circuits, cables, and sensors which are not shown. Such control components are used widely in many applications and are easily adapted to use in line gate 10.

In operation, both gates 20 and 21 are normally closed, with all manifold valves open. Water thus flows from upstream irrigation line 12, through both sides of upstream manifold 16, through leading and trailing gate pipes 20 and 21, through both sides of downstream manifold 18, and to downstream irrigation line 14. As a sensor (not shown) detects that leading gate pipe 20 is approaching an obstacle, leading valves 34 and 52 close and leading gate pipe 20 opens. When leading gate pipe 20 has passed the obstacle, it closes, and leading valves 34 and 52 open. Another sensor (not shown) senses when trailing gate pipe 21 approaches the obstacle. Trailing valves 35 and 53 then close and trailing gate pipe 21 opens. Trailing gate pipe 21 closes when it is past the obstacle, and trailing valves 35 and 53 open.

The irrigation line gate described above thus allows a moving irrigation line to continue past an obstacle without reversing direction or interrupting irrigation. The gate is particularly useful in automatic systems. While the particular construction described above makes it difficult to mount sprinkler heads on the portions of irrigation line constituting the gates pipes, it is possible to provide small holes in the gate pipes to drip irrigate under the line gate section. The sprinkler heads on either side of the line gate will of course be sufficient to irrigate under the line gate in most situations.

In compliance with the statute, the invention has been described in language more or less specific as to structural features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An irrigation line gate adapted to be connected between an upstream irrigation line and a downstream irrigation line of a mobile irrigation system to allow lateral movement of the irrigation system past an upstanding stationary obstacle in a direction perpendicular to the length of the lines, the irrigation line gate comprising:
   an upstream manifold adapted to be connected to the upstream irrigation line to receive water therefrom;
   a downstream irrigation manifold adapted to be connected to the downstream irrigation line to supply water thereto;
   at least two gate pipes spaced apart from one another in the direction of travel of the irrigation system; each of said gate pipes being operably connected between the upstream and downstream manifolds, each gate pipe being movable between an open position clear of one manifold so as to be capable of clearing an upstanding stationary obstacle as the irrigation system laterally passes the obstacle and a closed position spanning the two manifolds in fluid communication with the upstream and downstream manifolds.

2. An irrigation line gate as defined in claim 1 further comprising:
   pipe receiving means for engaging one end of each of the gate pipes at one of the manifolds when said gate pipe is in its closed position; and
   guide means for guiding said ends of the gate pipes into alignment with the pipe receiving means as the gate pipes move to their closed positions from their open positions.

3. An irrigation line gate as defined in claim 1 further comprising:
   pipe receiving means for slidably engaging one end of each of the gate pipes when said gate pipe is in its closed position;
   guide means for guiding said ends of the gate pipes into alignment with the pipe receiving means as the gate pipes move to their closed positions from their open positions; and
   clamping means for selectively clamping between said ends of the gate pipes and the pipe receiving means to thereby retain said ends of the gate pipes within the pipe receiving means.

4. An irrigation line gate as defined in claim 3 further comprising:
   support means for supporting each gate pipe at one of the manifolds; and
   locking means selectively connected between the support means and the gate pipes for preventing movement of the gate pipes relative to the one manifold when the gate pipes are in their closed positions.

5. An irrigation line gate as defined in claim 1 further comprising:
   support means for slidably guiding each gate pipe at one of the manifolds as they move longitudinally between their open and closed positions.

6. The irrigation line gate of claim 1 further comprising:
   leading and trailing pairs of pipe support collars which slidably receive each gate pipe at one of the manifolds, the support collars of each pair being longitudinally spaced to support the received gate pipe as it moves longitudinally between its open and closed positions.

7. The irrigation line gate of claim 6 wherein the pipe support collars have nylon bushings which receive the gate pipes while allowing slidable movement therethrough.

8. The irrigation line gate of claim 6 wherein the pipe support collars have oil-impregnated nylon bushings which receive the gate pipes while allowing slidable movement therethrough.

9. An irrigation line gate as defined in claim 1 further comprising:
   support slides which receive each gate pipe at one of the manifolds and allow the gate pipes to slide longitudinally therethrough; and
   locking means selectively connected between the support slides and the gate pipes for preventing longitudinal movement of the gate pipes relative to the support slides when the gate pipes are in their closed positions.

10. An irrigation gate adapted to be connected between an upstream irrigation line and a downstream irrigation line of a mobile irrigation system to allow lateral movement of the irrigation system past a stationary obstacle in a direction perpendicular to the length of the lines, the irrigation gate comprising:
    an upstream manifold adapted to be connected to the upstream irrigation line to receive water therefrom;
    a downstream manifold longitudinally spaced from the upstream manifold and adapted to be connected to the downstream irrigation line to supply water thereto;
    leading and trailing gate pipes spaced in the direction of travel of the irrigation system, each received and supported by a supporting one of the upstream and downstream manifolds, wherein each gate pipe is slidable in relation to its supporting manifold to open and closed positions, and wherein each gate pipe in its closed position engages a receiving other of the upstream and downstream manifolds to connect between the two manifolds; and drive means for sequentially driving the leading and trailing gate pipes between their open and closed positions.

11. The irrigation line gate of claim 10 further comprising:

engagement clamps between each gate pipe and its receiving manifold, wherein the engagement clamps urge the gate pipes into engagement with their receiving manifolds as the gate pipes move to their closed positions and wherein the engagement clamps thereafter selectively clamp between the gate pipes and their receiving manifolds to maintain engagement therebetween.

12. The irrigation line gate of claim 11 wherein each engagement clamp comprises:

an internally threaded nut attached to an end of one of the gate pipes;

a screw extending longitudinally from the receiving manifold to engage the internally threaded nut when said one of the gate pipes nears its closed position; and screw drive means for turning the screw as said one of the gate pipes nears its closed position to tighten said one of the gate pipes against its receiving manifold.

13. The irrigation line gate of claim 11 wherein each of the engagement clamps comprises:

an internally threaded nut attached to an end of one of the gate pipes;

a screw extending longitudinally from receiving the manifold to engage the internally threaded nut when said one of the gate pipes nears its closed position; and screw drive means on said second manifold for turning the screw as said one of the gate pipes nears its closed position to tighten said one of the gate pipes against its receiving manifold, the screw drive means including an elongated drive shaft to which the screw is slidably attached for limited longitudinal movement relative thereto, the screw being biased to an extended position relative to the drive shaft.

14. The irrigation line gate of claim 10 further comprising:

pipe receiving ferrules which slidably receive therein one end of each of the gate pipes at its receiving manifold when the gate pipe is in its closed position; and funnel-shaped guides around and projecting from the pipe receiving ferrules, wherein the funnel-shaped guides urge said ends of the gate pipes into alignment with the receiving ferrules as the gate pipes move to their closed positions from their open positions.

15. The irrigation line gate of claim 10 further comprising leading and trailing pairs of pipe support collars which slidably receive one of the gate pipes therethrough at its supporting manifold, the support collars of each pair being longitudinally spaced to support said one of the gate pipes as it moves between its open and closed positions.

16. The irrigation line gate of claim 15 wherein each pipe support collar has a nylon bushing which receives said one of the gate pipes within the support collar while allowing slidable movement therethrough.

17. The irrigation line gate of claim 15 wherein each pipe support collar has an oil-impregnated nylon bushing which receives said one of the gate pipes within the support collar while allowing slidable movement therethrough.

18. The irrigation line gate of claim 15 wherein:

at least one pipe support collar of each pair is a T-shaped fitting having a base member connected to and communicating with said supporting manifold and a tubular cross member which slidably receives said one of the gate pipes therethrough;

each tubular cross member has an opening which communicates with its respective base member; and said one of the gate pipes has an aperture which aligns with the cross member opening when said one of the gate pipes is in its closed position, whereby said supporting manifold communicates with said one of the gate pipes through the r-shaped fitting when said one of the gate pipes is in its closed position.

19. An irrigation line gate adapted to be connected between an upstream irrigation line and a downstream irrigation line of a mobile irrigation system to allow lateral movement of the irrigation system past a stationary obstacle in a direction perpendicular to the length of the lines, the irrigation line gate comprising:

an upstream manifold adapted to be connected to the upstream irrigation line to receive water therefrom;

a downstream manifold longitudinally spaced from the upstream manifold and adapted to be connected to the downstream irrigation line to supply water thereto;

leading and trailing gate pipes spaced in the direction of travel of the irrigation system;

leading and trailing pairs of pipe support collars, wherein each pair of support collars slidably receives one of the gate pipes therethrough at a supporting one of the two manifolds, the support collars of each pair being longitudinally spaced to support the said one of the gate pipes as it moves longitudinally between a closed position spanning the two manifolds and an open position clearing a receiving other of the two manifolds;

drive means for driving the leading and trailing gate pipes to their open positions as they each, respectively, approach the obstacle, and for driving them to their closed positions when they each, respectively, are past the obstacle;

pipe receiving ferrules on the receiving manifold which receive and communicate with the leading and trailing gate pipes when the respective gate pipes are in their closed positions; and funnel-shaped guides around and projecting from the pipe receiving ferrules, wherein the funnel-shaped guides urge the gate pipes into alignment with the receiving ferrules as the gate pipes move into their closed positions from their open positions.

20. The irrigation line gate of claim 19 further comprising:

engagement clamps which engage the gate pipes at their receiving manifold as they move into their closed positions and thereafter urge them into the receiving ferrules.

21. The irrigation line gate of claim 20 wherein each of the engagement clamps comprises:
   an internally threaded nut attached to an end of one of the gate pipes;
   a screw extending longitudinally from the receiving manifold to engage the internally threaded nut when said one of the gate pipes nears its closed position; and
   screw drive means for turning the screw as said one of the gate pipes nears its closed position to tighten said one of the gate pipes against its receiving manifold.

22. The irrigation line gate of claim 20 wherein each of the engagement clamps comprises:
   an internally threaded nut attached to an end of one of the gate pipes;
   a screw extending longitudinally from the receiving manifold to engage the internally threaded nut when said one of the gate pipes nears its closed position;
   screw drive means on said receiving manifold for turning the screw as said one of the gate pipes nears its closed position to tighten said one of the gate pipes against its receiving manifold, the screw drive means including an elongated drive shaft to which the screw is slidably attached for limited longitudinal movement relative thereto, the screw being biased to an extended position relative to the drive shaft.

23. The irrigation line gate of claim 19 wherein each pipe support collar has a nylon bushing which receives said one of the gate pipes within the support collar while allowing slidable movement therethrough.

24. The irrigation line gate of claim 19 wherein each pipe support collar has an oil-impregnated nylon bushing which receives said one of the gate pipes while allowing slidable movement therethrough.

25. The irrigation line gate of claim 19 wherein:
   at least one pipe support collar of each pair is a T-shaped fitting having a base member connected to and communicating with said supporting manifold and a tubular cross member which slidably receives said one of the gate pipes therethrough;
   each tubular cross member has an opening which communicates with its receiving base member; and
   said one of the gate pipes has an aperture which aligns with the cross member opening when said one of the gate pipes is in its closed position, whereby said supporting manifold communicates with said one of the gate pipes through the r-shaped fitting when said one of the gate pipes is in its closed position.

26. The irrigation line gate of claim 19 further comprising leading and trailing valves in each of the manifolds which are opened to supply water to and receive water from the respective gate pipes when they are in their closed positions and which are closed to stop the supply of water to the respective gate pipes when they are in their open position.

* * * * *